United States Patent [19]

Stiefel et al.

[11] 4,260,142
[45] Apr. 7, 1981

[54] ARRANGEMENT FOR RESILIENT ABSORPTION OF FORCES

[75] Inventors: Christian Stiefel, Aachen; Harry Jansen, Moers, both of Fed. Rep. of Germany

[73] Assignee: Ringfeder G.m.b.H., Krefeld, Fed. Rep. of Germany

[21] Appl. No.: 44,551

[22] Filed: Jun. 1, 1979

[30] Foreign Application Priority Data

May 4, 1979 [DE] Fed. Rep. of Germany ....... 2918095

[51] Int. Cl.$^3$ .............................................. F16F 3/06
[52] U.S. Cl. ................................................. 267/9 A
[58] Field of Search ................... 267/4, 9 R, 9 A, 9 B, 267/9 C, 22 R, 168

[56] References Cited

U.S. PATENT DOCUMENTS

| 2,146,015 | 2/1939 | Haseltine | 267/9 A X |
| 3,164,263 | 1/1965 | Novikov et al. | 267/9 B X |

FOREIGN PATENT DOCUMENTS 2657836  6/1978  Fed. Rep. of Germany .......... 267/9 A

*Primary Examiner*—Duane A. Reger
*Attorney, Agent, or Firm*—Michael J. Striker

[57] ABSTRACT

An arrangement for resilient absorption of forces, particularly for an intermediate buffer coupling of rail vehicles, has an elongated housing with a closed end and an open end, a friction device located in the region of the open end, and a resilient element in the housing, cooperating in series with the friction device and formed as a friction spring including a plurality of conical inner and outer rings cooperating with one another with interposition of a lubricant. An opening of the open end of the housing has a smaller diameter than a portion of the housing wherein the resilient element is accommodated. Two telescopable cup-shaped members are located in the housing and accommodate the rings of the friction spring. One of the cup-shaped members has a diameter exceeding the diameter of the opening of the housing and is constituted by an elastically deformable material.

10 Claims, 7 Drawing Figures

4,260,142

ARRANGEMENT FOR RESILIENT ABSORPTION OF FORCES

BACKGROUND OF THE INVENTION

The present invention relates to an arrangement for resilient absorption of forces, particularly for intermediate buffer couplings of rail vehicles.

Arrangements of the above-mentioned general type are known in the art. A known arrangement has a housing which is open at its one end, and a resilient support or element accommodated in the housing. The resilient support cooperates in series with a friction device in the region of the open end of the housing. An opening of the open end of the housing has a diameter which is smaller than the inner diameter of a portion of the housing, in which the resilient support is located.

Spring devices provided in conventional draw and buffer arrangements must be constructed so as to perform the stroke in correspondence with especially high energy absorption which is required in connection with increasing weight of the vehicles and careful treatment of transported loads.

One of the related arrangements is disclosed in the German Auslegescrift No. 1 455 238. The friction device comprises a substantially central wedge-formed member with surrounding friction shoes. The housing of the arrangement is provided at its open end with projections which reduces the cross section of the opening of the housing. Further projections provided on the wedge-formed member cooperate with the above-mentioned projections of the housing so as to limit outward displacement. When percussive force acts upon the arrangement, the central wege-formed member displaces into the interior of the housing. This force is splitted into two components on inclined surfaces of the wedge-formed member and inclined surfaces of the friction shoes, which surfaces form wedge pairs. One of the force components presses the friction shoes, inwardly of the housing, whereas the other force component presses the friction shoes outwardly toward strong frictional engagement with respective inner surfaces in the region of the open end of the housing. The cylindrical resilient element counteracts the inward displacement of the friction shoes, with interposition of a plate. The resilient element has a stiffness codetermined for the energy absorption of the friction device. The resilient element in the known construction is composed of interconnected disc springs of rubber or similar elastomeric material, which allows to support the friction device and to return it to its starting position only to a limited extent. At the same time, it is known from experience that such springs have a service life which is smaller than that of the vehicle.

SUMMARY OF THE INVENTION

Accordingly, it is an object of the present invention to provide an arrangement for resilient absorption of forces, which avoids the disadvantages of the prior art.

More particularly, it is an object of the present invention to provide an arrangement which possesses higher energy absorption properties whose friction device more reliably returns to its initial position, and whose resilient element has a greater service life as compared with those of known arrangements.

In keeping with these objects and with others which will become apparent hereinafter, one feature of the present invention resides, briefly stated, in an arrangement in which a resilient element is formed as a friction spring composed of a plurality of conical outer and inner rings which cooperate with one another with interposition of a lubricant and are enclosed in two telescopable cup-shaped casing members of which an outer cup-shaped casing member has a diameter exceeding the diameter of an inlet opening of a housing and is constituted of a resiliently deformable material. The outer cup-shaped casing member may be constituted of a synthetic plastic material. An inner cup-shaped casing member may be constructed in a similar manner. In such a case, the outer diameter of the inner cup-shaped member which exceeds the diameter of the inlet opening of the housing is so adjusted relative to the outer diameter of the outer rings of the friction spring accommodated therein that an elastic deformation of the inner cup-shaped member is sufficient for insertion thereof into the housing.

In order to facilitate deformation of the outer cup-shaped member this member, in accordance with one embodiment of the invention, has an opening in its bottom and an edge which bounds the openings and is in direct contact with a flange of a pressure cup of a clamping device wich holds the friction spring with prestress. It is also possible that the inner housing cup-shaped member is similarly formed and connected with the clamping device. In such a construction, the friction spring, without participation of the outer relatively elastic cup-shaped member and, if needed, the inner cup-shaped member, takes up the forces resulting from pulling or pressing loads applied to the arrangement in the longitudinal direction of the same.

In accordance with another feature of the present invention, the outer cup-shaped member has an opening in its bottom, and an edge bounding this opening is connected with the inner ring of the friction spring in direct contact with this inner ring.

In order to center both cup-shaped casing members and thereby also the friction spring located therein, the outer cup-shaped member has ribs extending outwardly from the outer surface of this member. They abut against the inner surface or the housing in the longitudinal direction and are flexible in a circumferential direction of the outer surface of the outer cup-shaped member.

A further feature of the present invention is that the portions of the telescopable cup-shaped members which overlap one another, together form a chamber filled by a sealing medium such as grease. This provides for maximum sealing and easy movement of the cup-shaped members relative to one another.

Advantages which are attained by the present invention include the provision of a spring arrangement with a high energy absorption in the sense of improved damping of the forces which act upon the arrangment. This is performed by the friction spring which, on the one hand, forms an effective support for the friction device with resulting strong frictional engagement of the friction shoes with the friction surface in the housing and, on the other hand, takes up with its inherent high damping the remaining axial force component which displaces the friction shoe inwardly. Thereby reliable return of the friction device to its initial position after withdrawal of the percussive force is guaranteed. A further advantage is the longer service life of the arrangement which also results from the provision of the cup-shaped casing members protecting the friction spring from dust and moisture. The cup-shaped members also prevent the action of the lubricant of the friction spring upon the friction surfaces of the friction device. The outer cup-shaped member has such a construction that the friction spring can have an especially large diameter which is important for its energy absorption characteristics.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
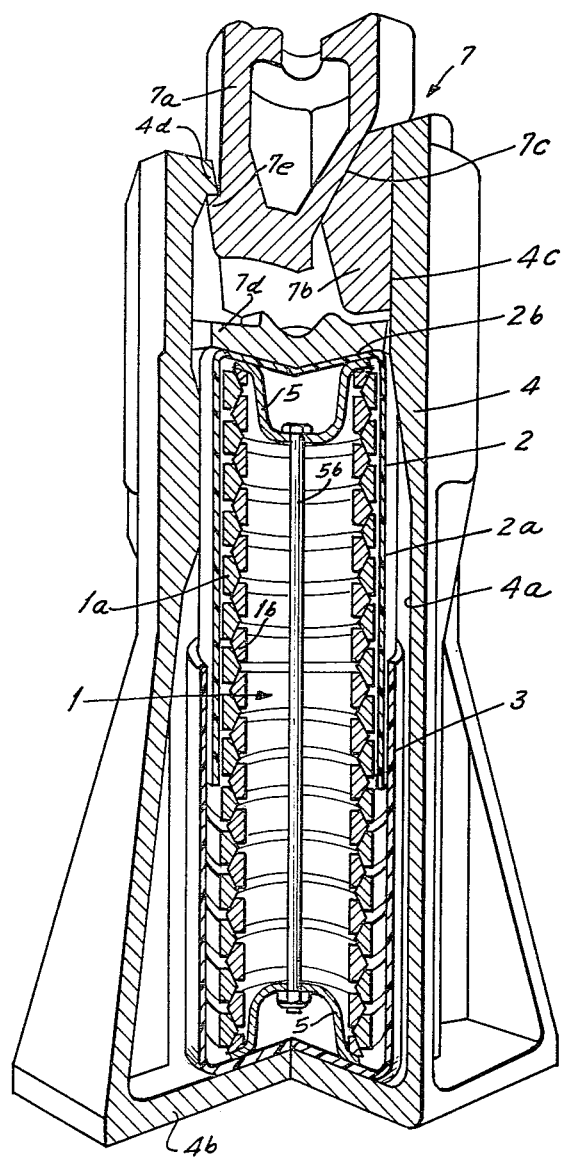
FIG. 1 is a partially sectioned perspective view of an arrangement in accordance with the present invention.

An arrangement shown in FIG. 1 has a housing 4 with a base plate 4b which is connected with the housing 4 and has resistance to bending. A friction device 7 is arranged at an open end of the housing 4. It has a central wedge-formed member 7a and friction shoes 7b cooperating with this member through wedge surfaces 7c. The friction shoes 7b abut against an inner wall 4c of the housing 4 and against a plate 7d. In order to limit the stroke of displacement of the friction device 7 toward the open end of the housing 4, the wedge-formed member 7a has outer projections 7e which engage with inwardly extending projections 4d of the housing 4 located below.

Figures 2, 3:
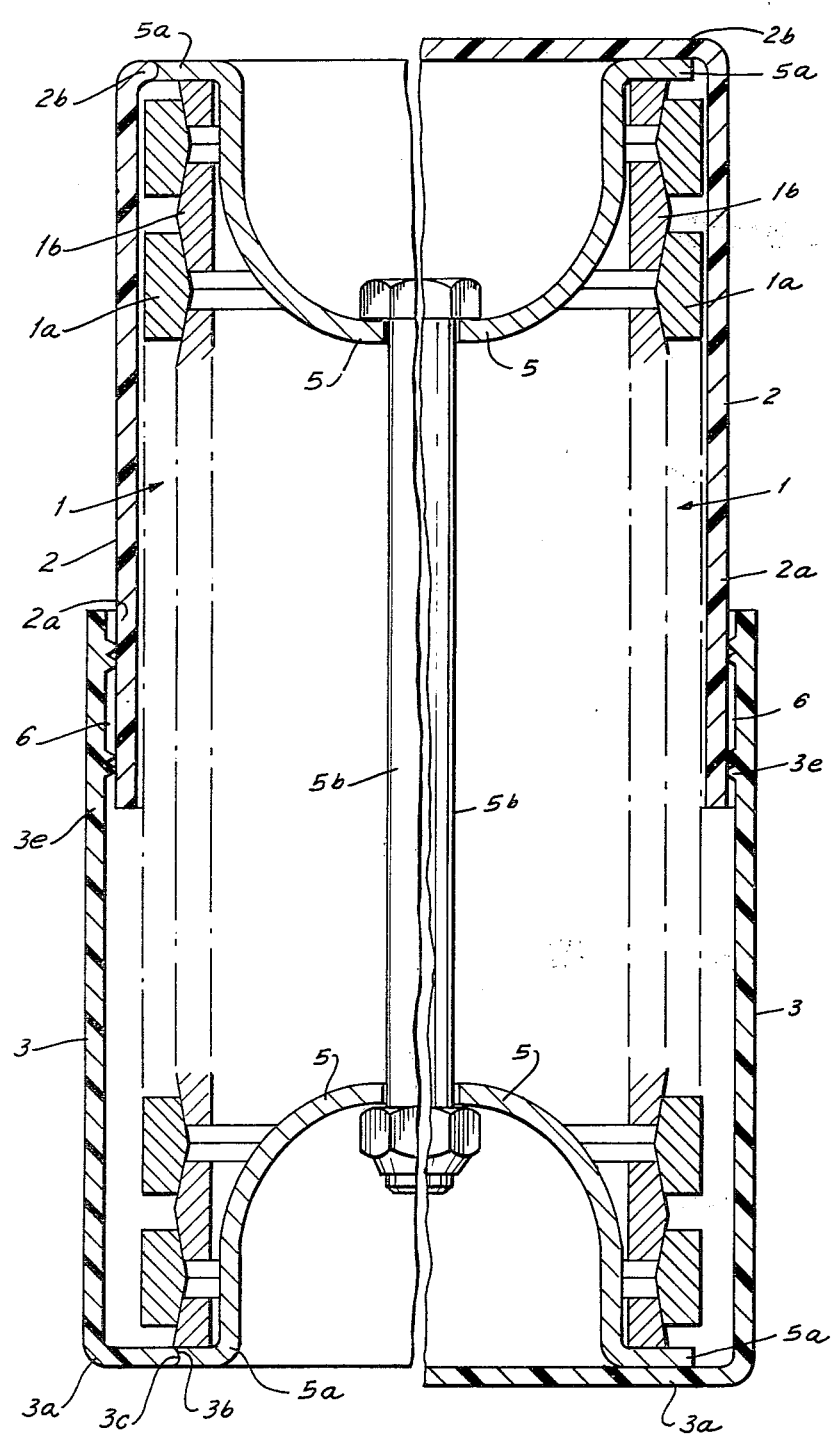
FIG. 2 is a partially sectioned view of a cup-shaped casing member of the inventive arrangement, in enlarged scale.
FIG. 3 is a view corresponding to that shown in FIG. 2, but illustrating another embodiment of the invention.

The friction device 7 is supported in the interior of the housing by a friction spring 1 arranged between the plate 7d and the base plate 4b of the housing 4 in the region of a wall 4a having a larger diameter. As shown in FIGS. 1 and 2, the friction spring 1 is formed by double-conical outer rings 1a and inner rings 1b. The outer rings 1a and the inner rings 1b have conical surfaces which are guided over one another with the utilization a suitable lubricant, such as for example, a grease. The rings 1a and 1b are held with one another under tension by a clamping device which includes pressure cups and a pulling screw 5b, whereby a ready-to-insert unit is formed.

Dirt and moisture penetrating into the housing 4 to the friction spring 1 and lubricant acting upon the friction surfaces 4c of the housing can considerably reduce the energy absorption of the friction spring 1 and the friction device 7. In order to prevent the penetration of dirt and moisture into the housing 4 to the friction spring 1 and the action of the lubricant upon the friction surfaces 4c, the friction spring 1 is surrounded by two telescopically cooperating cup-shaped casing member 2 and 3. The inner cup-shaped member 2, as shown in FIG. 1, abuts against the plate 7d, whereas the outer cup-shaped member 3 abuts against the base plate 4b. If a bottom 2b of the inner cup-shaped member 2 has a sufficient thickness, the separate plate 7d can be omitted. It is also possible that the inner cup-shaped member 2 is formed by a tube which is connected to 9 suitable plate 7d by welding.

Figure 7:
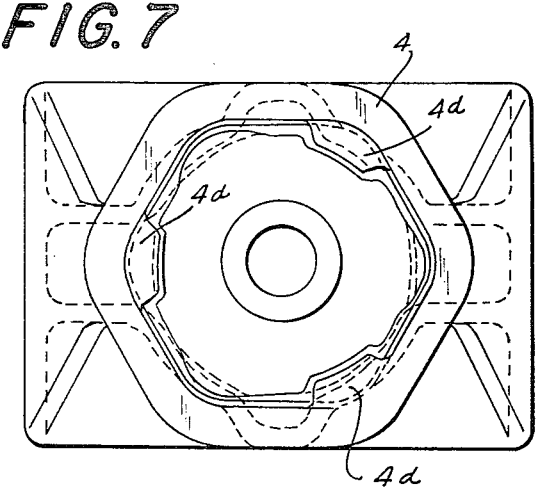
FIG. 7 is a view showing an open end of a housing of the inventive arrangement.

As can be seen from FIGS. 1 and 7, the size, of the open end of the housing 4, which is limited by the projections 4d is selected in correspondence with the dimensions, particularly the diameters of members which are inserted into the housing 4. In connection with this and also in order to provide the greatest possible energy absorption of the friction spring 1, the outer diameter of the inner cup-shaped member 2 is adjusted correspondingly to the size of the open end of the housing. Thus, the outer diameter of the inner cup-shaped member 2 is such that, with the exception of the small thickness of a wall 2a, the friction spring has an especially large diameter.

The outer cup-shaped member 3, as can be seen from FIG. 2, has a larger outer diameter as compared with the reduced diameter in the region of the open end of the housing 4. The outer cup-shaped member 3 is constituted of an elastically deformable material, for example, of a synthetic plastic material, so that the outer cup-shaped member 3 can be inserted into the housing 4 by passing between the projections 4d. A next step in the process of assembling of the spring arrangement is the insertion of the prestressed friction spring 1 clamped by the clamping device including the pressure cups 5 and the screw 5b, as well as of the inner cup-shaped member 2 into the outer cup-shaped member 3 located in the housing 4. A chamber 6 is formed in the region of the wall 2a of the inner cup-shaped member 2 and the wall 3e of the outer cup-shaped member 3, which walls telescopically overlap one another. The chamber 6 accommodates a grease and serves for a maximum possible sealing and an easy displacement of the casing cup-shaped members 2 and 3 toward one another.

An arrangement shown in FIG. 3 substantially corresponds to the arrangement shown in FIG. 2. However, the former differs from the latter in that the outer cup-shaped member 3 has a hole 3b in its bottom 3a. When the outer cup-shaped member 3 and the friction spring 1 are inserted in the housing 4, an edge 3c which bounds the hole 3b of the outer cup-shaped member 3 abuts against and is in direct contact with a flange 5a of the pressure cup 5 of the clamping device. The inner cup-shaped member 2 is connected with the other pressure cup 5 of the clamping device in a similar manner.

Figure 4:
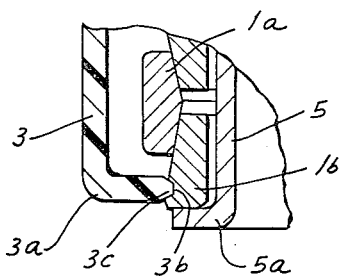
FIG. 4 and FIG. 5 are views showing two possible connections of the cup-shaped casing members, particularly of an outer cup-shaped member.
Figure 5:
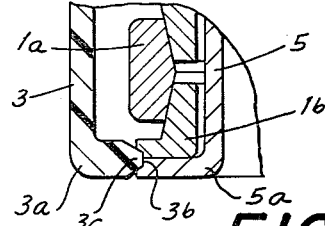
Figure 6:
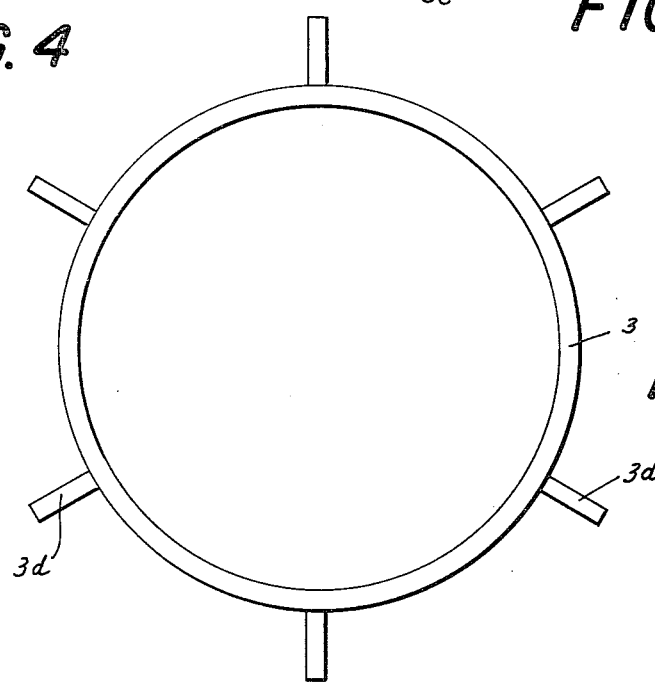
FIG. 6 is a plan view showing the outer cup-shaped member with additional guiding elements.

FIGS. 4 and 5 show further possible connections for the outer cup-shaped member 3. In the embodiment shown in FIG. 4 the outer cup-shaped member 3 and the inner ring 1b of the friction spring 1 abut against and are in direct contact with one another. In the embodiment shown in FIG. 5 the outer cup-shaped member 3 abuts against and is in direct contact with the inner ring 1b of the friction spring 1 and also with the flange 5a of the pressure cup 5 of the clamping device. It is to be understood that the similar connections are provided for the inner cup-shaped member 2.

In order to perform advancement, after centering of the cup-shaped member 2 and 3 and the friction spring 1 located therein, inwardly of the housing 4, the arrangement in accordance with all above-described embodiments may be provided with ribs 3d on the outer cup-shaped member 3. These ribs 3d are flexible in a circumferencial direction of the outer surface of the outer cup-shaped member 3 so as not to hinder insertion of the same into the housing. In inserted position of the outer cup-shaped member 3, the ribs 3d abut against the inner wall 4a of the housing 4.

It will be understood that each of the elements described above, or two or more together, may also find a useful application in other types of constructions differing from the types described above.

While the invention has been illustrated and described as embodied in an arrangement for resilient absorption of forces it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for resiliently absorbing forces, particularly for an intermediate buffer coupling for rail vehicles, comprising an elongated housing having two spaced ends, one of said ends of said housing being closed, whereas the other of said ends is open and has an opening, a friction element located in the region of said open end of said housing; a resilient element cooperating in series with said friction element and located in a portion of said housing which is spaced from said opening in direction of elongation of said housing, said opening of said housing having a transverse dimension which is smaller than the inner transverse dimension of said portion of said housing in which said resilient element is located, said resilient element being formed as a friction spring having a plurality of inner conical rings and a plurality of outer conical rings which cooperate with one another with interposition of a lubricant; outer and inner cup-shaped casing members in said housing and telescopable in one another, said cup-shaped member closably accommodating said outer rings and said inner rings therebetween and being sealed relative to one another, at least said outer cup-shaped member having a diameter which exceeds the transverse dimension of said opening of said housing and being constituted by an elastically deformable material; and a clamping device including two pressure cups in the interior of said cup-shaped members, said cups being spaced from one another in the direction of elongation and pressing said rings toward one another in said direction so that said friction spring is held prestress, said outer cup-shaped member having a bottom wall provided with an opening which is bounded by an edge, and the pressure cup located adjacent to said bottom wall having an outwardly extending flange which cooperates with said edge of said bottom wall in direct contact with the same.

2. An arrangement for resiliently absorbing forces, particularly for an intermediate buffer coupling of rail vehicles, comprising an elongated housing having two spaced ends, one of said ends of said housing being closed, whereas the other of said ends is open and has an opening; a friction element located in the region of said open end of said housing; a resilient element cooperating in series with said friction element and located in a portion of said housing which is spaced from said opening in direction of elongation of said housing, said opening of said housing having a transverse dimension which is smaller than the inner transverse dimension of said portion of said housing in which said resilient element is located, said resilient element being formed as a friction spring having a plurality of inner conical rings and a plurality of outer conical rings which cooperate with one another with interposition of a lubricant; and outer and inner cup-shaped casing members in said housing and telescopable in one another, said cup-shaped members closably accommodating said outer rings and said inner rings therebetween and being sealed relative to one another, at least said outer cup-shaped member having a diameter which exceeds the transverse dimension of said opening of said housing and being constituted by an elastically deformable material, said outer cup-shaped member having a bottom wall provided with an opening which is bounded by an edge, the inner ring of said friction spring, which is located adjacent to said bottom wall cooperating with said edge of said bottom wall in direct contact with the same.

3. An arrangement for resiliently absorbing forces, particularly for an intermediate buffer coupling of rail vehicles, comprising an elongated housing having two spaced ends, one of said ends of said housing being closed, whereas the other of said ends is open and has an opening; a friction element located in the region of said open end of said housing; a resilient element cooperating in series with said friction element and located in a portion of said housing which is spaced from said opening in direction of elongation of said housing, said opening of said housing having a transverse dimension which is smaller than the inner transverse dimension of said portion of said housing in which said resilient element is located, said resilient element being formed as a friction spring having a plurality of inner conical rings and a plurality of outer conical rings which cooperate with one another with interposition of a lubricant; and outer and inner cup-shaped casing members in said housing and telescopable in one another, said cup-shaped members closably accommodating said outer rings and said inner rings therebetween and being sealed relative to one another, at least said outer cup-shaped member having a diameter which exceeds the transverse dimension of said opening of said housing, said outer cup-shaped member being elastically deformable so that despite the fact that its diameter exceeds the transverse dimension of said opening of said housing, said outer cup-shaped member can be inserted into said housing through said opening because of its capability of being deformed during this insertion from its diameter exceeding the transverse dimension of said opening of said housing to a diameter at least equal to the same.

4. An arrangement as defined in claim 3, wherein said outer cup-shaped member is constituted of a synthetic plastic material.

5. An arrangement as defined in claim 3; and further comprising a clamping device including two pressure cups in the interior of said cup-shaped members, which cups are spaced from one another in the direction of elongation and press said rings toward one another in said direction so that said friction spring is held with prestress.

6. An arrangement as defined in claim 3, wherein said housing has an inner surface, said outer cup-shaped member having an outer surface and a plurality of ribs which extend outwardly from said outer surface of said outer cup-shaped member and abut against said inner surface of said housing.

7. An arrangement as defined in claim 6, wherein said ribs are elongated and extend in the direction of elongation of said housing.

8. An arrangement as defined in claim 6, wherein said ribs are resiliently yieldable in a circumferential direction of said outer surface of said outer cup-shaped member.

9. An arrangement as defined in claim 3, wherein said telescopable outer and inner cup-shaped members have portions which overlap one another and together form a chamber which is filled by a sealing medium.

10. An arrangement as defined in claim 9, wherein said chamber is filled by a lubricant.

* * * * *